United States Patent Office 3,531,494
Patented Sept. 29, 1970

3,531,494
MONOHYDROXY ALKYL IMIDAZOLES
Heinrich Adolphi, 11 Kalmitweg, Limburgerhof, Pfalz, Germany; Anna Steimmig, 9 Freinsheimerstrasse, Ludwigshafen (Rhine), Germany; and Hermann Spaenig, 5 Eschkopfstrasse, Limburgerhof, Pfalz, Germany
No Drawing. Filed July 11, 1966, Ser. No. 563,964
Claims priority, application Germany, July 22, 1965, 1,542,690
Int. Cl. C07d 49/36
U.S. Cl. 260—309                    2 Claims

ABSTRACT OF THE DISCLOSURE

Imidazole derivatives having the structural formula indicated below and uses thereof as insecticide ingredients in admixture with pyrethrins, carbamates and phosphoric acid esters.

---

The present invention relates to new imidazole derivatives. It also relates to insecticidal compositions which have a marked effect on insects.

It is an object of the invention to provide new imidazole derivatives. Another object of the invention is to provide insecticidal compositions which contain prior art insecticides and imidazole derivatives, the prior art insecticides being present only in small amounts. Another object of the invention is to control insects with the said compositions.

The use of imidazole for controlling injurious insects has been proposed by Pence (J. econ. Ent. 56, pages 1 to 7, 1963). Imidazole is supposed to function as antimetabolite for histamine and nicotinic acid and especially when mixed with boric acid, displays an effect on textile pests. The effect of this mixture is however only slight.

We have now found that imidazole derivatives having the formula $$\begin{array}{c} H-C=\!\!=\!\!C-R^3 \\ | \quad\quad | \\ N \quad\quad N-R^1 \\ \diagdown \diagup \\ C \\ | \\ R^2 \end{array}$$

in which $R^1$ denotes a hydrogen atom or a linear or branched, saturated or unsaturated alkyl chain having one to thirteen carbon atoms, which may bear as substituents the following atoms or radicals: chlorine, hydroxyl, amino, diethylamino, morpholyl, alkoxy having two to thirteen carbon atoms, cyclohexoxy, phenyl and phenyl bearing nitro or alkyl having one to twelve carbon atoms as substituents, $R^1$ may also denote the radical of dimethylacetal, diethylacetal, phenylmethylacetal, the phenyl radical being substituted by methyl groups and chlorine atoms, the radical of propionic acid, alkylene propionates (the alkylene radical having one to four carbon atoms), the radical of an acetylethylene ester or acetylpropylene ester, $R^2$ denotes hydrogen or the phenyl radical or an alkyl radical having one to three carbon atoms which may bear hydroxyl groups as substituents, $R^3$ denotes a hydrogen atom or an ethyl radical which may bear hydroxyl groups or chlorine atoms as substituents, $R^1$, $R^2$ and $R^3$ not being hydrogen simultaneously, or the salts of these compounds, have a marked synergistic action on pyrethrins, carbamates or phosphoric esters. The known insecticidal action of these active ingredients is considerably enhanced by the said imidazole derivatives.

The salts in this specification include salts with inorganic or organic acids, for example hydrochloric acid, sulfuric acid, phosphoric acid, nitric acid, formic acid, acetic acid, trichloroacetic acid, p-toluenesulfonic acid, phenol, cresol and methylsulfuric acid.

The imidazole derivatives may be prepared by cyclization synthesis of imidazoles by prior art methods by dehydrogenation of imidazolines or by further conversion of imidazoles, mainly by N-substitution. The N-substitution may be carried out by known methods by reaction of imidazoles or their salts with ethyl halides or esters of oxalic acid or carbonic acid or by reaction with alcohols in contact with water-eliminating catalysts. By adding imidazoles on to reactive double bonds, N-substitution products are also formed. The imidazoles may also be modified by methylolation or conversion of functional groups, for example esterification, conversion of chlorine into amino groups or by salt formation.

For example the production of dodecylimidazolylacetaldehyde -O,N-acetal having the formula $$\begin{array}{c} H \quad\quad H \\ | \quad\quad | \\ H \quad C=\!\!=\!\!C \\ | \quad\quad | \\ H_{25}C_{12}-O-C-N \quad\quad N \\ | \quad\quad \diagdown \diagup \\ CH_3 \quad\quad C \\ | \\ H \end{array}$$

may be carried out as follows:

318 parts (by weight) of vinyl dodecyl ether, 68 parts of imidazole and 1 part of hydroquinone are heated for five hours at 180° C. while stirring.

The reaction mixture is then vacuum distilled. Dodecyl-imidazolylacetaldehyde-O,N-acetal distils at 171° to 174° C. at 1.7 mm. Hg in a yield of 206 parts (i.e. 73.5% of the theory).

Insecticides according to this invention may be prepared by mixing the imidazole derivatives with known insecticidal active ingredients. They may also contain conventional solid or liquid carriers and/or other active ingredients.

Pyrethrins in this specification include not only unpurified or purified pyrethrum extracts but also the pyrethrins isolated from these extracts and the synthetic analogues, for example allethrin.

Carbamates include for example the α-naphthyl ester of N-methylcarbamic acid (Carbaryl), isopropoxyphenylmethyl carbamate (Propoxur) and 4-dimethylamino-3,5-xylylmethyl carbamate (Zectran).

Phosphoric esters include for example O,O-dimethyl-S-(1,2-di-(ethoxycarbonyl) - ethyl) - phosphorus dithioate (Malathion), O,O - dimethyl - S-methylcarbamoylmethyl-phosphorus dithioate (Dimethoate) and O,O-dimethyl-O-4-bromo-2,5-dichlorophenylphosphorus dithioate (Bromophos).

The imidazole derivatives and the active ingredients may be used in any relative proportions. We prefer a mixing ratio of imidazole derivative to active ingredient to 10:1 to 1:1 parts by weight.

The following tables gives a selection of active compounds with their melting points (M.P.) or boiling point (B.P.) at the reduced pressure indicated:

1.—
$$\begin{array}{c} \boxed{N \quad N-CH_3} \\ | \\ CH_2-CH_2-OH \end{array}$$
M.P. 58° C.

2.—
$$\begin{array}{c} \boxed{N \quad N-CH_2-CH-C_4H_9} \\ | \\ C_2H_5 \end{array}$$
B.P. 12 150° C.

3.—
$$\boxed{N \quad N-C_{12}H_{25}}$$
B.P. 1 150–152° C.

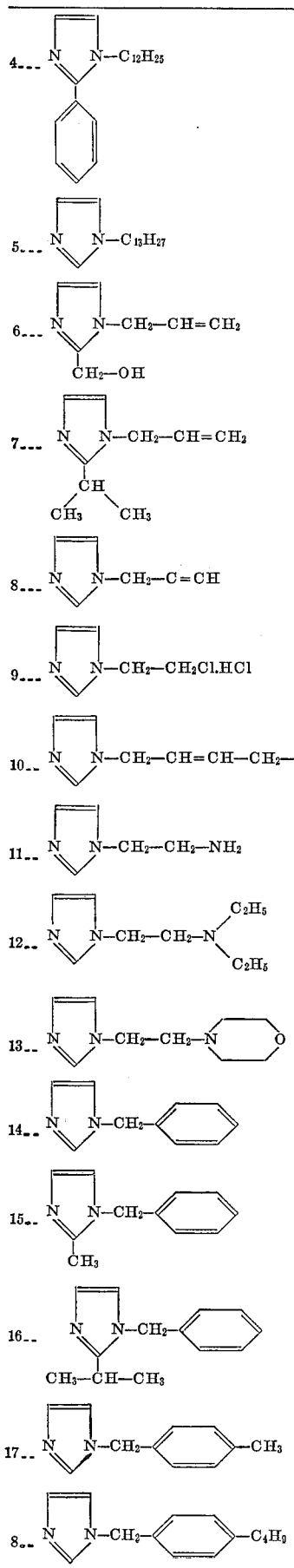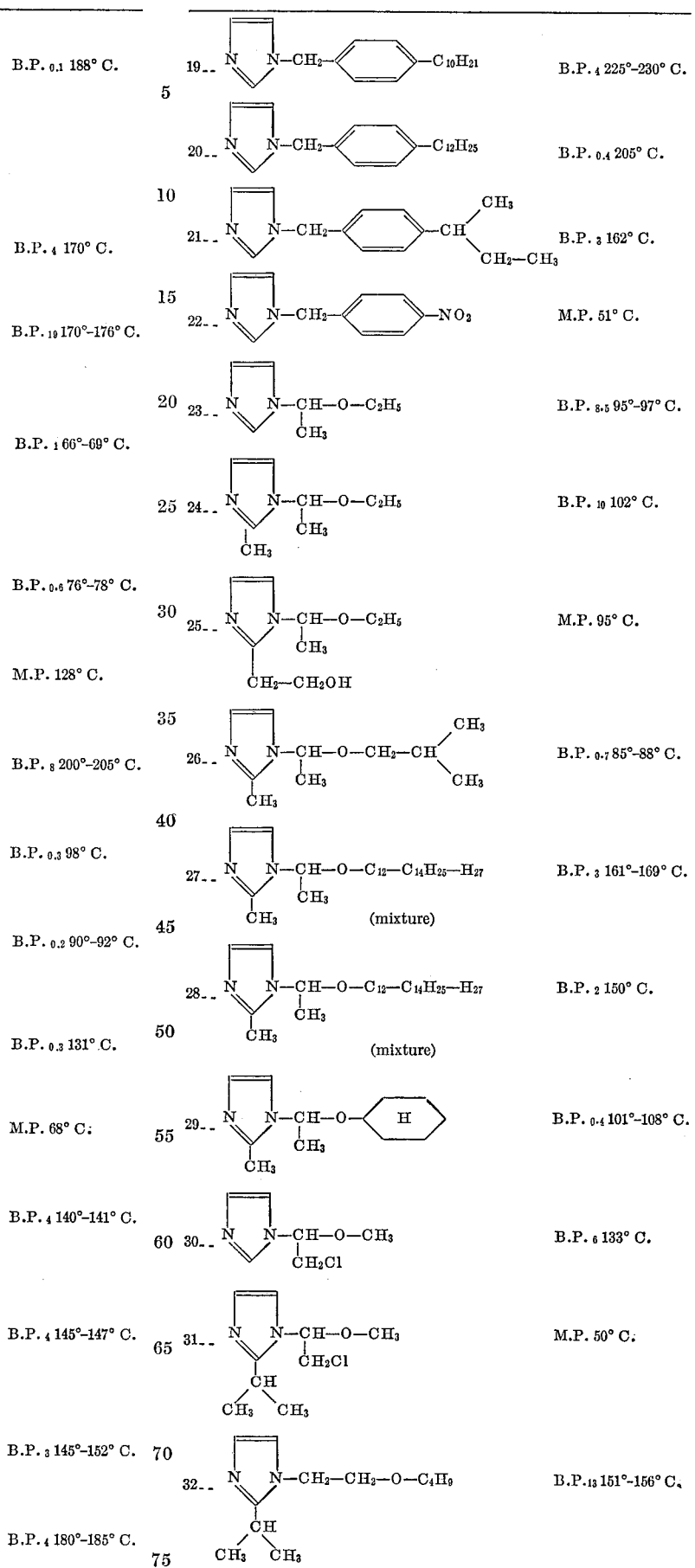

| No. | Structure | B.P./M.P. |
|---|---|---|
| 33 | pyrazole-N-CH$_2$-CH(O-CH$_3$)(O-CH$_3$) | B.P.$_{0.7}$ 101°–102° C. |
| 34 | pyrazole-N-CH$_2$-CH(O-C$_2$H$_5$)(O-C$_2$H$_5$) | B.P.$_1$ 110°–112° C. |
| 35 | pyrazole-N-CH$_2$-CH(O-CH$_3$)(O-C$_6$H$_3$(Cl)(CH$_3$)) | M.P. 60.5° C. |
| 36 | 3-isopropylpyrazole-N-CH$_2$-CH(O-CH$_3$)(O-C$_6$H$_3$(CH$_3$)$_2$) | B.P.$_2$ 184° C. |
| 37 | pyrazole-N-CH$_2$-CH$_2$-COOH | M.P. 149° C. |
| 38 | pyrazole-N-CH$_2$-CH$_2$-C(O)-O-CH$_3$ | B.P.$_4$ 61°–63° C. |
| 39 | 3-isopropylpyrazole-N-CH$_2$-CH$_2$-C(O)-O-CH$_3$ | B.P.$_2$ 128°–130° C. |
| 40 | 3-methylpyrazole-N-CH$_2$-CH$_2$-C(O)-O-C$_2$H$_5$ | M.P. 62° C. |
| 41 | 3-isopropylpyrazole-N-CH$_2$-CH$_2$-C(O)-O-C$_2$H$_5$ | B.P.$_3$ 135°–136° C. |
| 42 | 3-isopropylpyrazole-N-CH$_2$-CH$_2$-C(O)-O-C$_4$H$_9$ | B.P.$_2$ 142°–145° C. |
| 43 | pyrazole-N-CH$_2$-CH$_2$-O-C(O)-CH$_3$ | B.P.$_4$ 146°–149° C. |
| 44 | 3-isopropylpyrazole-N-CH$_2$-CH(CH$_3$)-O-C(O)-CH$_3$ | B.P.$_{1.2}$ 122°–124° C. |
| 45 | imidazole-CH$_2$-CH$_2$OH | M.P. 90° C. |
| 46 | imidazole-CH$_2$-CH$_2$Cl·HCl | M.P. 90° C. |

The following known phosphoric acid esters are used for the following experiments:

I. (CH$_3$O)$_2$P(S)-S-CH(COO-C$_2$H$_5$)-CH$_2$-COO-C$_2$H$_5$
Malathion

II. (CH$_3$O)$_2$P(S)-S-CH$_2$-CO-NH-CH$_3$
Dimethoate

III. (CH$_3$O)$_2$P(S)-O-C$_6$H$_2$(Cl)$_2$(Br)
Bromophos

IV. (CH$_3$O)$_2$P(O)-O-C(CH$_3$)=CH-CO-N(CH$_3$)$_2$ and the following known carbamates:

V. 1-naphthyl-O-CO-NH-CH$_3$
Carbaryl

VI. 2-isopropoxyphenyl-O-CO-NH-CH$_3$
Propoxur

VII. 4-(dimethylamino)-3,5-dimethylphenyl-O-CO-NH-CH$_3$

The following known synergists are used as comparison substances:

VIII. Piperonyl butoxide (methylenedioxyphenyl-CH(CH$_2$-CH$_2$-CH$_3$)-CH$_2$-O-CH$_2$-CH$_2$-O-CH$_2$-CH$_2$-O-C$_4$H$_9$)

IX. Butyl-carbitol-piperonylate (methylenedioxyphenyl-C(O)-O-CH$_2$-CH$_2$-O-CH$_2$-CH$_2$-O-C$_4$H$_9$)

The action of the above-mentioned substances is illustrated in the following examples.

EXAMPLE 1

Synergistic effort on pyrethrins

Petri dishes having a diameter of 10 cm. are wetted with an acetone solution of the active ingredient so that a coating of 0.1 mg. of pyrethrin and 1 mg. of synergist is contained in each dish. Fifty granary weevils (*Sitophilus granaria* L.) are placed in each of the dishes after the solvent has evaporated. The effect is determined after sixty minutes and stated in percentage mortality (M). 100% means that all insects are dead.

In the following table S=No. of synergist (as in the lists above); mg.=amount of synergist used; M=percentage mortality; P=pyrethrin; A–10%=amount of pyrethrin which gives 10% mortality; E=effect of the mixture given as percentage mortality.

| S | Mg. | M | P | A-10%, mg. | E |
|---|---|---|---|---|---|
| 1 | 1 | 0 | +P | 0.1 | 93 |
| 2 | 1 | 10 | +P | 0.1 | 100 |
| 3 | 1 | 8 | +P | 0.1 | 100 |
| 4 | 1 | 72 | +P | 0.1 | 99 |
| 5 | 1 | 1 | +P | 0.1 | 100 |
| 6 | 1 | 2 | +P | 0.1 | 93 |
| 8 | 1 | 6 | +P | 0.1 | 91 |
| 9 | 1 | 4 | +P | 0.1 | 100 |
| 10 | 1 | 0 | +P | 0.1 | 100 |
| 11 | 1 | 0 | +P | 0.1 | 100 |
| 12 | 1 | 2 | +P | 0.1 | 100 |
| 13 | 1 | 0 | +P | 0.1 | 93 |
| 14 | 1 | 14 | +P | 0.1 | 100 |
| 15 | 1 | 24 | +P | 0.1 | 100 |
| 16 | 1 | 14 | +P | 0.1 | 93 |
| 17 | 1 | 0 | +P | 0.1 | 100 |
| 18 | 1 | 8 | +P | 0.1 | 100 |
| 19 | 1 | 0 | +P | 0.1 | 100 |
| 20 | 1 | 2 | +P | 0.1 | 94 |
| 21 | 1 | 0 | +P | 0.1 | 100 |
| 23 | 1 | 10 | +P | 0.1 | 100 |
| 24 | 1 | 12 | +P | 0.1 | 100 |
| 25 | 1 | 10 | +P | 0.1 | 94 |
| 26 | 1 | 10 | +P | 0.1 | 100 |
| 27 | 1 | 6 | +P | 0.1 | 100 |
| 28 | 1 | 0 | +P | 0.1 | 100 |
| 29 | 1 | 0 | +P | 0.1 | 98 |
| 30 | 1 | | +P | 0.1 | 100 |
| 31 | 1 | | +P | 0.1 | 100 |
| 32 | 1 | 18 | +P | 0.1 | 98 |
| 33 | 1 | | +P | 0.1 | 100 |
| 34 | 1 | 0 | +P | 0.1 | 100 |
| 36 | 1 | | +P | 0.1 | 95 |
| 38 | 1 | 0 | +P | 0.1 | 100 |
| 39 | 1 | 18 | +P | 0.1 | 100 |
| 40 | 1 | 14 | +P | 0.1 | 95 |
| 41 | 1 | 4 | +P | 0.1 | 100 |
| 43 | 1 | 0 | +P | 0.1 | 98 |
| 45 | 1 | 8 | +P | 0.1 | 100 |
| 46 | 1 | 2 | +P | 0.1 | 100 |
| IX | 1 | 0 | +P | 0.1 | 91 |
| Boric acid | 1 | 0 | | | |
| 3 | 0.5 | | +P | 0.1 | 99 |
| 5 | 0.5 | | +P | 0.1 | 100 |
| 28 | 0.5 | | +P | 0.1 | 99 |
| VIII | 0.5 | | +P | 0.1 | 90 |
| IX | 0.5 | | +P | 0.1 | 81 |
| Imidazole | 1 | | +P | 0.1 | 24 |
| Imidazole | 1 | | | | 0 |
| Imidazole | 1 | | + Boric acid | 1 | 0 |

EXAMPLE 2.—SYNERGISTIC ACTION ON ALLETHRIN[1]

| | | |
|---|---|---|
| Allethrin | 0.2 mg | 30 |
| Allethrin | 0.1 mg | 15 |
| S. 3 | 1 mg.+0.1 mg. Allethrin | 100 |
| S. 3 | 0.5 mg+0.1 mg. Allethrin | 88 |
| S. 5 | 1 mg.+0.1 mg. Allethrin | 97 |
| S. 5 | 0.5 mg+0.1 mg. Allethrin | 73 |
| S. 16 | 1 mg.+0.1 mg. Allethrin | 100 |
| S. 16 | 0.5 mg.+0.1 mg. Allethrin | 53 |
| S. 23 | 1 mg.+0.1 mg. Allethrin | 97 |
| S. 24 | 1 mg.+0.1 mg. Allethrin | 92 |
| S. 27 | 1 mg.+0.1 mg. Allethrin | 88 |
| S. 28 | 1 mg.+0.1 mg. Allethrin | 98 |
| S. 28 | 0.5 mg.+0.1 mg. Allethrin | 99 |
| S. IX | 1 mg.+0.1 mg. Allethrin | 62 |
| S. IX | 0.5 mg.+0.1 mg. Allethrin | 44 |
| S. VIII | 0.5 mg.+0.1 mg. Allethrin | 45 |

[1] Experimental procedure as in Example 1.

EXAMPLE 3

Synergistic action on phosphoric esters

The procedure of Example 1 is followed; the effect is determined after two hours.

In the table, Mal=Malathion; A-32%=amount of Malathion required to give 32% mortality.

| S | Mg. | M | Mal | A-32%, mg. | E |
|---|---|---|---|---|---|
| 3 | 1 | 8 | +Mal | 0.1 | 90 |
| 9 | 1 | 4 | +Mal | 0.1 | 70 |
| 16 | 1 | 40 | +Mal | 0.1 | 100 |
| 23 | 1 | 10 | +Mal | 0.1 | 97 |
| 24 | 1 | 12 | +Mal | 0.1 | 96 |
| 26 | 1 | 10 | +Mal | 0.1 | 98 |
| 27 | 1 | 6 | +Mal | 0.1 | 95 |
| 29 | 1 | 0 | +Mal | 0.1 | 95 |
| 37 | 1 | 2 | +Mal | 0.1 | 96 |
| 39 | 1 | 18 | +Mal | 0.1 | 85 |
| 40 | 1 | 0 | +Mal | 0.1 | 89 |
| 41 | 1 | 0 | +Mal | 0.1 | 86 |
| 44 | 1 | 2 | +Mal | 0.1 | 86 |
| VIII | 1 | 4 | +Mal | 0.1 | 12 |

| S | | | | M |
|---|---|---|---|---|
| 3 | 0.4 mg. + 0.02 mg | IV | | 74 |
| 3 | + 0.02 mg | IV | | 7 |
| 28 | 0.4 mg. + 0.02 mg | IV | | 55 |
| IX | 0.4 mg. + 0.02 mg | IV | | 1 |
| | 0.4 mg. + 0.02 mg | IV | | 17 |
| 3 | 0.5 mg. + 0.1 mg | III | | 43 |
| 3 | + 0.1 mg | III | | 0 |
| IX | 0.5 mg. + 0.1 mg | III | | 3 |
| VIII | 0.5 mg. + 0.1 mg | III | | 2 |
| 16 | 2 mg. + 0.1 mg | II | | 67 |
| 16 | + 0.2 mg | II | | 5 |
| 16 | 2 mg | II | | 8 |

EXAMPLE 4

Synergistic effect on pyrethrins

Houseflies in light $CO_2$ narcosis receive 1 cu. mm. of an acetone solution of the active ingredient applied to the ventral abdomen. Mortality is determined four hours later and the LD50 (lethal dose 50%) is calculated therefrom.

In the table the calculated values are given in $\gamma$/fly for the amount of pyrethrin used in each case.

| Pyrethrin | | | LD 50 | 0.12 $\gamma$/fly |
|---|---|---|---|---|
| Pyr.+S | 13 | 1:8 | LD 50 | 0.071 $\gamma$/fly. |
| Pyr.+S | 3 | 1:10 | LD 50 | 0.043 $\gamma$/fly. |
| Pyr.+S | 21 | 1:10 | LD 50 | 0.05 $\gamma$/fly. |
| Pyr.+S | 28 | 1:10 | LD 50 | 0.025 $\gamma$/fly. |
| Pyr.+S | 33 | 1:10 | LD 50 | 0.079 $\gamma$/fly. |
| Pyr.+S | 35 | 1:10 | LD 50 | 0.06 $\gamma$/fly. |
| Pyr.+S | 36 | 1:10 | LD 50 | 0.087 $\gamma$/fly. |

By adding the synergists, the amount of pyrethrin required to kill 50% of the flies is substantially decreased. The LD 50 of the pure substances was in all cases more than 10 $\gamma$/fly and was therefore not determined more exactly.

EXAMPLE 5

Synergistic effect on carbamates

Petri dishes having a diameter of 10 cm. are wetted with an acetone solution of the active ingredient and houseflies are placed in the dishes after the solvent has evaporated. Four hours later the mortality of the flies is determined.

| | | Mg. | M, percent |
|---|---|---|---|
| V | 2 mg | | 0 |
| V | 0.2 mg.+S. 21 | 0.2 | [1] 100 |
| V | 0.1 mg.+S. 21 | 0.1 | [1] 70 |
| | S. 21 | 0.2 | [2] 5 |
| V | 0.2 mg.+S. 17 | 0.2 | [1] 85 |
| | S. 17 | 0.2 | 10 |
| V | 0.2 mg.+S. 27 | 0.2 | 60 |
| | S. 27 | 0.2 | 0 |
| V | 2 mg.+S. 7 | 2 | 95 |
| | S. 7 | 2 | 95 |
| V | 1 mg.+S. 3 | 1 | 100 |
| V | 0.5 mg.+S. 3 | 1 | 100 |
| | S. 3 | 1 | 8 |
| V | 2 mg.+S. 28 | 1 | 100 |
| V | 1 mg.+S. 28 | 1 | 100 |
| V | 0.5 mg.+S. 28 | 1 | 79 |
| VI | 0.01 mg | | 30 |
| VI | 0.005 mg.+S. 28 | 0.025 | 85 |
| VII | 0.1 mg | | 48 |
| VII | 0.1 mg.+S. 3 | 0.05 | 97 |
| VII | 0.1 mg.+S. 3 | 0.1 | 94 |
| VII | 0.1 mg.+S. 3 | 0.5 | 98 |
| VII | 0.1 mg.+S. 28 | 0.05 | 60 |
| VII | 0.1 mg.+S. 28 | 0.5 | 77 |

[1] Mixture.
[2] Single active ingredient.

We claim:
1. An imidazole having the formula:

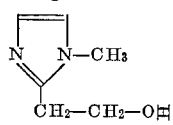

2. An imidazole having the formula:
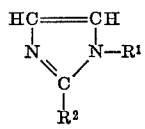
wherein R¹ is —CH₃, —CH₂—CH=CH₂, or
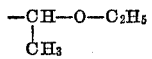
and R² is a monohydroxyalkyl group having 1–3 carbon atoms.
References Cited
UNITED STATES PATENTS
| | | | |
|---|---|---|---|
| 2,404,299 | 7/1946 | Kyrides | 260—309 |
| 3,178,446 | 4/1965 | Samnicolo | 260—309 |
| 3,418,333 | 12/1968 | Warren. | |
ALEX MAZEL, Primary Examiner
J. TOVAR, Assistant Examiner
U.S. Cl. X.R.
260—247.5; 424—269

UNITED STATES PATENT OFFICE
CERTIFICATE OF CORRECTION

Patent No. 3,531,494            Dated September 29, 1970

Inventor(s) Heinrich Adolphi et al.

It is certified that error appears in the above-identified patent and that said Letters Patent are hereby corrected as shown below:

In the heading to the printed specification, line 5, after "Germany" insert -- assignors to Badische Anilin- & Soda-Fabrik Aktiengesellschaft, Ludwigshafen am Rhein, Germany --.

Signed and sealed this 5th day of January 1971.

(SEAL)
Attest:

EDWARD M. FLETCHER, JR.           WILLIAM E. SCHUYLER, JR.
Attesting Officer                 Commissioner of Patents